United States Patent

Mulready et al.

[15] 3,699,471

[45] Oct. 17, 1972

[54] STRAY RADIATION SUPPRESSION DEVICE

[72] Inventors: Richard C. Mulready, Jupiter; Edward A. Pinsley, North Palm Beach, both of Fla.

[73] Assignee: United Aircraft Corporation, East Hartford, Conn.

[22] Filed: July 20, 1971

[21] Appl. No.: 164,363

[52] U.S. Cl. ............................................. 331/94.5
[51] Int. Cl. ............................................. H01s 3/02
[58] Field of Search ................... 331/94.5; 330/4.3

[56] References Cited

UNITED STATES PATENTS 3,292,102   12/1966   Byrne ..................... 331/94.5
3,445,785   5/1969   Koester et al ............. 331/94.5

*Primary Examiner*—William L. Sikes
*Attorney*—Jack N. McCarthy

[57] ABSTRACT

A series of fences are placed across the side walls of a flow channel forming the optical cavity of a gas dynamic laser which contains the gas dynamic laser flow therein and are positioned between end walls containing the laser beam mirrors and apertures. The fences are positioned lengthwise with the direction of flow and are located on each side wall of the optical cavity. They are spaced so that they will absorb and/or reflect all rays intersecting the optical cavity side walls at a grazing incidence. The invention herein described was made in the course of or under a contract with the Air Force.

4 Claims, 2 Drawing Figures

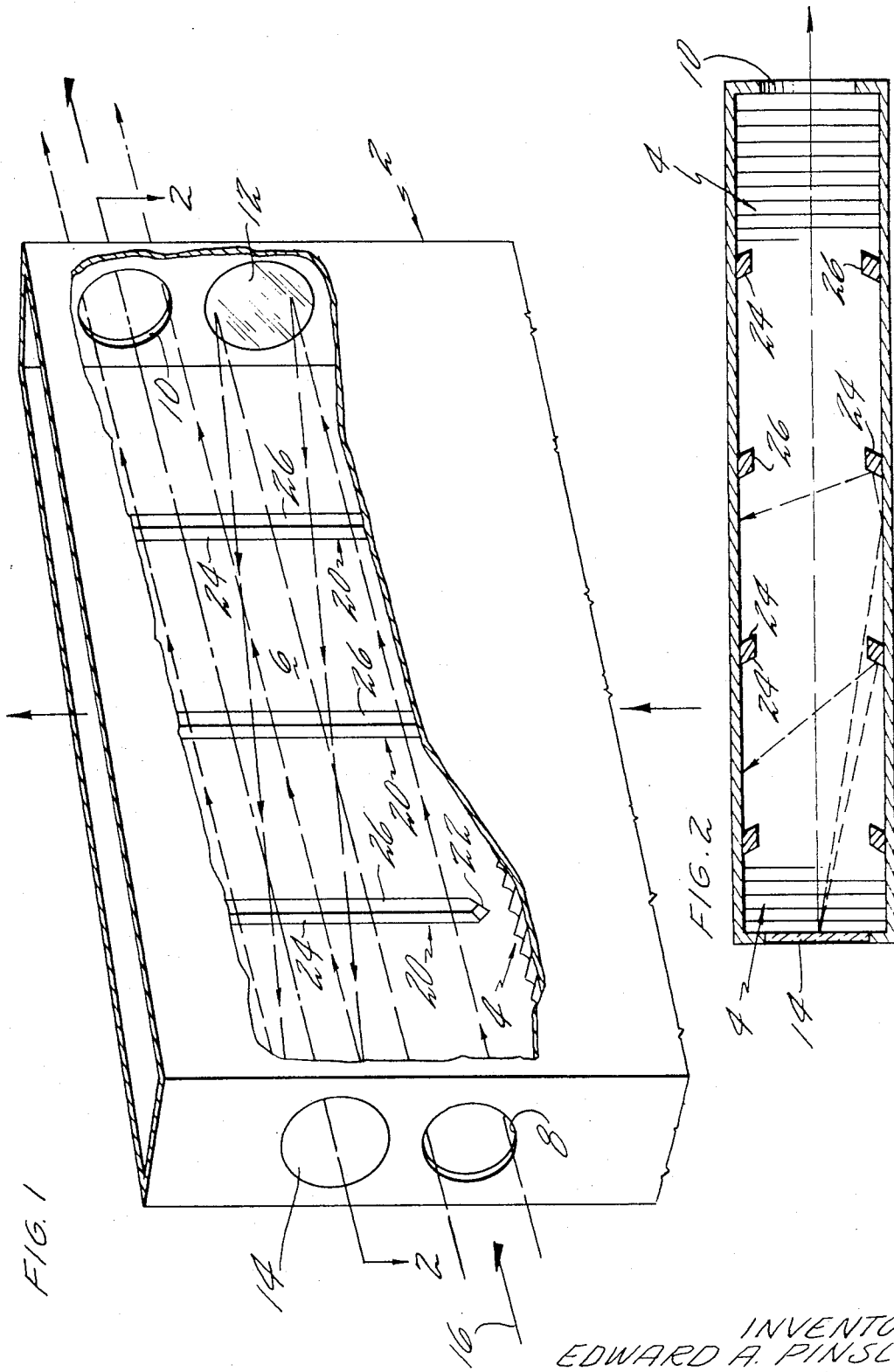

STRAY RADIATION SUPPRESSION DEVICE

BACKGROUND OF THE INVENTION

In a high gain gas dynamic laser, unwanted stray radiation can be generated by various means (i.e., diffraction of the beam as it passes through the apertures of the optical cavity; components of diffuse reflection of the beam as it is reflected from non-perfect mirror surfaces forming the optical cavity; reflection of beam edges intercepted by apertures, etc.) into paths which form low angles with the desired beam path. This radiation can be reflected back into the cavity by the cavity walls since all wall materials are highly reflective at grazing incidence angles. Such reflected stray radiation is then amplified by the active cavity medium, producing undesirable losses in power and beam quality, and undesirable feedback due to reflection and parasitic regeneration.

While means have been used to absorb rays of grazing incidence in various devices, nothing has been found for suppressing such stray radiation within a channel containing gas dynamic laser flow.

SUMMARY OF THE INVENTION

The stray radiation suppression device is used to disperse and absorb unwanted radiation by insuring that all single bounce, specular, cavity-side-wall reflections of off-axis rays entering the cavity from one end wall aperture or mirror, and which would otherwise be reflected by the cavity side walls to a mirror or aperture at the opposing end wall, will be intercepted and deflected and/or partially absorbed by at least one fence.

A series of fences are provided which are sufficiently low in height so that any one fence will not intercept on-axis rays passing between the cavity end wall apertures and mirrors.

BRIEF DESCRIPTION OF THE DRAWINGS

FIG. 1 is a view of a section of a channel having gas dynamic laser flow therein with a portion of a side wall removed showing the active optical cavity.

FIG. 2 is a sectional view taken on the line 2—2 of FIG. 1.

DESCRIPTION OF THE PREFERRED EMBODIMENT

FIG. 1 shows a section of a gas dynamic laser flow channel 2 which is generally rectangular in shape and includes a nozzle means 4 at its upstream end through which the laser gas medium flows. An optical cavity 6 is located downstream of the nozzle means and is formed between laser beam input aperture 8 and output aperture 10 in the cavity end walls. A mirror 12 on the end wall opposite the input aperture 8 reflects an input laser beam 16 to mirror 14 which in turn reflects the beam through the output aperture 10. This forms a Z-type laser amplifier optical configuration. The source of the laser beam 16 may be an oscillator or any other means. While the optical configuration shown in FIG. 1 is typical, the invention can be applied to other optical configurations including gas dynamic laser oscillator configurations.

Fences 20 are placed longitudinally of the channel 2 and are located just downstream of the nozzle means 4 which expands a flow of the proper molecular composition from a high pressure, high temperature gas source (not shown) to produce a low-static-pressure supersonic flow at the nozzle exit plane, thereby forming a vibrational state population inversion and hence a high potential for generating laser power. The nozzle means 4 is of a type which is arranged in a cascade across the flow channel 2. A nozzle means of this type is shown in U.S. Application Ser. No. 729,494 filed May 10, 1968 now U.S. Pat. No. 3,602,432 for a WAFER NOZZLE to Richard C. Mulready.

Each fence 20 is formed having a streamlined end 22 located at its upstream leading edge so that it will have a minimum effect on the supersonic laser gas flow. The top 26 of the fence 20 as well as sides 24 shown in FIG. 2 may be angled with respect to the side walls of the flow channel 2 to obtain a desired angle of reflection of the stray radiation. Alternately, the cross section of the fence 20 may be semicircular, triangular, quadrilateral, etc., instead of the rhomboidal shape shown in FIG. 2. In FIG. 1 the end 22 is shown as a tapered sharp edge.

In FIG. 2 various rays are drawn showing how the fences reflect grazing rays into the walls at low angles of incidence. Said walls may be painted or roughened to be highly absorbent at low incidence angles. By properly spacing fences of adequate size and number, it is possible to suppress all grazing reflections which are not otherwise absorbed by the cavity walls or rejected by the various interpass end wall apertures.

We claim:

1. In combination a gas dynamic laser comprising a flow channel, means providing a gas containing constituents necessary to obtain a lasing action, expansion means in said flow channel, a lasing region of low pressure downstream of said expansion means, a means for directing a lasing beam into said lasing region substantially transversely of the flow of said channel, an input aperture located in said flow channel for transmitting said laser beam from said means into said flow channel, an output aperture located in said flow channel forming an exit for said laser beam, a series of fences on each side of said lasing region, said fences being positioned to intercept all single bounce specular reflections of stray unwanted off-axis rays to provide deflection and/or absorption thereof.

2. A combination as set forth in claim 1 wherein there are reflector means in said flow channel, thereby forming at least two laser beam passes, said fences extending having a length covering the combined width of the laser beam passes.

3. A combination as set forth in claim 1 wherein the fences extend longitudinally into the flow channel, and the upstream end of each fence is formed having a streamlined contour.

4. A combination as set forth in claim 3 wherein the upstream end of each fence is formed having an edge with tapered sides extending to the width of the fence.

* * * * *